219-121 SR

MTR04 XR 3,178,804

1

April 20, 1965 L. R. ULLERY, JR., ETAL 3,178,804

FABRICATION OF ENCAPSULED SOLID CIRCUITS

Filed April 10, 1962 3 Sheets-Sheet 1

See Fig 29 projects EB through material and welds on opposite surface

INVENTORS
LEE R. ULLERY JR.
DOMENICK J. GARIBOTTI

BY [signature]
AGENT

FABRICATION OF ENCAPSULED SOLID CIRCUITS

Filed April 10, 1962

3 Sheets-Sheet 2

INVENTORS
LEE R. ULLERY JR.
DOMENICK J. GARIBOTTI
BY [signature]
AGENT

FABRICATION OF ENCAPSULED SOLID CIRCUITS

Filed April 10, 1962 3 Sheets-Sheet 3

INVENTORS
LEE R. ULLERY JR.
DOMENICK J. GARIBOTTI
BY [signature]
AGENT

United States Patent Office
3,178,804
Patented Apr. 20, 1965

3,178,804
FABRICATION OF ENCAPSULED SOLID CIRCUITS

Lee R. Ullery, Jr., Simsbury, and Domenick J. Garibotti, Hazardville, Conn., assignors to United Aircraft Corporation, East Hartford, Conn., a corporation of Delaware Filed Apr. 10, 1962, Ser. No. 186,467
18 Claims. (Cl. 29—155.5)

Our invention relates to hermetically sealed semiconductor devices. More particularly, our invention is directed to new and unique techniques for the surface encapsulation of integrated crystal circuits and for the inter and intra connections of such circuits.

Semiconductor devices, particularly those fabricated from Group IV elements, are ultra-sensitive to surface contamination even at ambient pressures and temperatures. The area of especial sensitivity is that of the junctions. For example, in a three terminal device such as a transistor, the width of the base area may be only a few ten thousandths of an inch. Since silicon and other semiconductor materials are easily contaminated by adsorbed impurities and by chemical reaction at the surfaces, surface states and hence surface conductivity is vastly changed by the addition of minute quantities of impurities. It is obvious that, because of the small width of the base and the voltage difference between the emitter and collector, a relatively high field exists in the base region. Consequently, any small change in the conductivity of the surface in the base region will result in a shunt of the voltage across the base and a corresponding loss or degradation of transistor action. For this and other reasons, shunting of the junction by surface contamination must be avoided in the fabrication and during service life of junction devices. The present state of the art of fabrication of such semiconductive devices utilizes several methods to accomplish this end. One of these methods is the vacuum or hermetic encapsulation of the entire device in an enclosure which provides for electrically insulated leads of the glass or ceramic to metal seal type. This approach has the inherent deficiencies of volumetric inefficiency, possible contamination during fabrication and instability, since encapsulated atmospheres influence device performance under different thermal cycles. A second prior art method consists of the surface passivation of the critical area by a process which renders the surface inactive, followed by encapsulation in a polymeric body. However, the normal mechanical bond formed between silicon or other semiconductors and polymeric materials is not sufficient to protect the surface from attack over extended periods of time. That is, past attempts to protect the critical surface by "potting" have met with little success, particularly for high frequency transistors, since leakage of moisture and other impurities still occurs around the leads. Also, present state of the art polymeric materials experience degradation with time or in the presence of ozone and ultraviolet or other short wavelength radiation.

Another problem inherent in prior art encapsulated semi-conductor devices arises from their sensitivity to heat. As is well known, heat is generated in semiconductor devices at the junctions. Prior art devices dissipated this heat by conduction thereof through the leads connected to the device or through the bulk of the host material itself. Because of the obvious thermal inefficiency of these prior art methods of heat dissipation the devices are subject to failure due to overheating. It is therefore often necessary to place the encapsulated devices in yet another container such as a cryogenic package or to provide an adequate heat sink. These approaches, of course, add to the volumetric inefficiency.

In recent years, the complexity of electronic circuits has increased, particularly in the digital computer field. In this area, extremely large numbers of switches and bi-stable devices are necessary in order to construct the electronic logic required for intelligent computing devices. As the speed of computers increases, the complexity and operational speed becomes limited not by the semiconductor devices utilized but by the interconnections between them since the conductive paths between devices can very easily become the order of wavelengths at the frequencies of interest. Much has been done to reduce the size of junction devices and the packages into which they are encapsulated, and to eliminate or shorten the inter-connections between them. One method of miniaturization is the integrated crystal circuit approach. In most cases, the amount of semiconducting material required to fabricate a junction device is many times less than that required for the encapsulation and leads which must be provided for the attachment of the devices into a complex circuit. It is therefore, a logical conclusion that volumetric efficiency may be improved by selecting standard circuits using a number of junction devices and fabricating this array of devices on one slab of material by utilizing the host lattice as the intraconnecting medium between junction areas and omitting all but one of the encapsulating bodies. In addition, the volume required for a certain degree of electronic intelligence can be further reduced dy doping the semiconducting materials to provide the passive resistor elements in such circuits. Similarly, properly fabricated semiconductor junctions which will perform as voltage dependent capacitors can be provided in the slab. However, prior art crystal circuit packages still present the problems caused by overheating and surface contamination in the area of the junctions. Obviously, the more transistors and diodes that are fabricated in a single crystal circuit the more critical these problems become.

In fabricating prior art integrated crystal circuits it is accepted practice to deposit leads and passive elements on the outer surface of a layer of silicon dioxide which has been grown on the surface of the crystal circuit host material. These leads and passive elements are separated from the host semiconductor crystal surface by a distance in the neighborhood of thousands of Angstroms. Because silicon dioxide is a dielectric material and further because of the relatively small distance between the semiconductor surface and the above mentioned leads and passive elements, the capacitance between the leads and passive elements and the crystal circuit elements is high. These high capacitances limit the high frequency performance of the integrated crystal circuit.

Our invention overcomes the above disadvantages by providing novel encapsulated semiconductor devices and methods for fabricating these devices.

It is, therefore, an object of our invention to provide novel encapsulated semiconductor devices.

It is another object of our invention to surface encapsulate semiconductor devices.

It is still another object of our invention to hermetically seal the junction areas of semiconductor devices.

It is yet another object of our invention to join an encapsulating membrane to a semiconductor device.

It is also an object of our invention to provide vertical and horizontal hermetic electrical connection to encapsulated semiconductor devices.

It is a further object of our invention to provide vertical and horizontal hermetic electrical connections between encapsulated semiconductor devices.

It is also an object of our invention to provide hermetic intra connections between the circuit elements of an encapsulated semiconductor device.

It is another object of our invention to provide for blind welding of contacts and connections to encapsulated semiconductor devices.

It is still another object of our invention to reduce the inter element and connection capacitances of encapsulated semiconductor devices.

It is also an object of our invention to improve the high frequency response of encapsulated semiconductor devices.

It is further object of our invention to provide for improved heat dissipation from encapsulated semiconductor devices.

These and other objects of our invention are accomplished by joining an impervious encapsulating membrane to a semiconductor device to provide for hermetic sealing of an entire surface or the junction areas of the device. In a preferred embodiment of our invention, the joining is accomplished by electron beam welding. Our invention also encompasses various modes of fabricating hermetic electrically conductive feed-throughs between the exposed surface of the membrane and the semiconductor device. By the practice of our invention, the junction areas of the semiconductor device are protected from contamination to an extent previously not achieved, while the volumetric efficiency and high frequency performance of the encapsulated device is greatly improved. Also, the danger of breakdown due to overheating is greatly reduced.

Our invention may be better understood and its numerous advantages will become apparent to those skilled in the art from the following disclosure taken together with the accompanying drawings in which like references numerals refer to like elements in the various figures and wherein.

Figures 1, 2, 3, 4, 5, 6, 7, 8, 9, 10, 11, 12, 13:
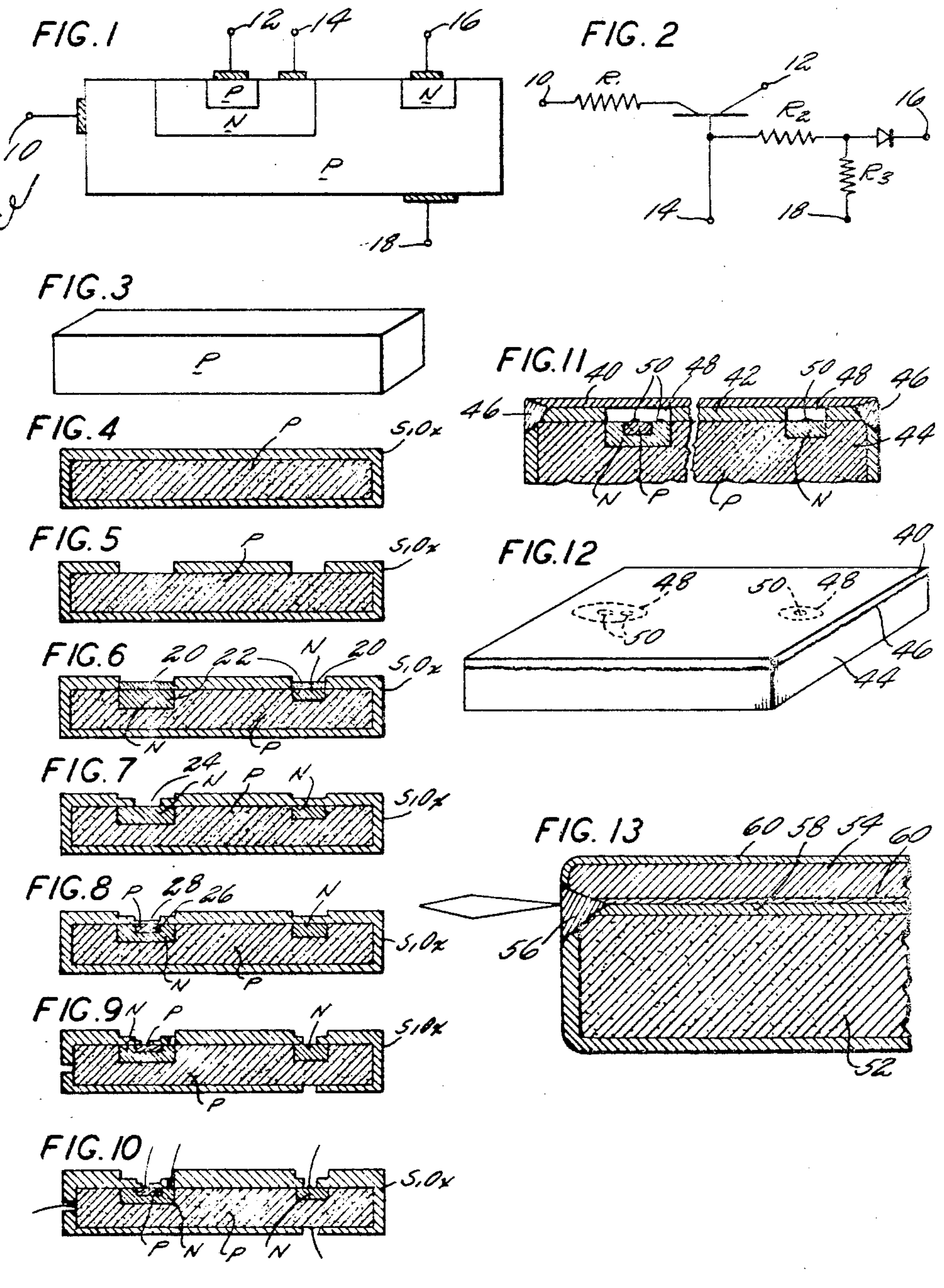
FIGURE 1 is an illustration of an integrated crystal circuit device.
FIGURE 2 is a schematic drawing of the equivalent electrical circuit of the device shown in FIGURE 1.
FIGURES 3 through 10 illustrate various steps in a method of fabricating an integrated crystal circuit device.
FIGURE 11 is a cross-sectional view of a portion of an encapsulated crystal circuit device fabricated in accordance with our invention.
FIGURE 12 is an isometric view of the device shown in part in FIGURE 11.
FIGURE 13 illustrates a portion of a semiconductor device encapsulated in accordance with our invention.

Referring now to FIGURE 1, an elementary coplanar crystal circuit is shown schematically. This crystal circuit may be fabricated, in the manner to be described below, so as to have the electrical characteristics of the circuit shown schematically in FIGURE 2. The same reference numerals refer to the same contacts in both FIGURES 1 and 2. As illustrated in these two figures, using essentially the same amount of semiconducting material formerly required for one transistor, it is possible to fabricate a five terminal device consisting of three resistors, a transistor, and a diode. Moreover, this five terminal device could be packaged in the same container used for a single transistor if it contains provisions for five insulated leads.

The device shown in FIGURE 1 may be fabricated in the manner shown in FIGURES 3 through 10. FIGURE 3 depicts a slab or chip of silicon of the proper geometry which has been grown with a proper impurity to yield a "p" type semiconductor of the proper resistivity. This chip may have dimensions of .100 inch by .05 inch by .005 inch. The chip is first surface passivated with $SiO_x$, by methods well known in the art, to yield the structure shown in cross section in FIGURE 4. The layer of $SiO_x$ may have a thickness of 2000 to 10,000 A. Next, the $SiO_x$ is coated with a photosensitive material which is subsequently exposed to light through a high resolution mask. The unexposed portions, being soluble, are removed by a solvent rinse. A hydrofluoric acid etch is then applied to dissolve the $SiO_x$ from the area not protected by the photosensitive material. The resulting configuration is shown in FIGURE 5. The next step consists of diffusion of "n" type impurities into the etched regions to form diodes and/or the bases of transistors. The impurities will diffuse into the surface of the chip only where it has been exposed by the etching process because the layer of $SiO_x$ protects the underlying slicion from the impurity in other regions. During the diffusion process, which is usually done at elevated temperatures, a new layer of $SiO_x$ will be formed in the areas where it has been previously etched away. This new layer of $SiO_x$ is indicated by reference numeral 20 in FIGURE 6. As can be seen in FIGURE 6, an "n-p" junction has been formed in the areas indicated by reference numeral 22. Next, the chip is again masked and etched to provide for the diffusion of the emitter regions of any transistors to be fabricated. During this step, etching may also be used to provide areas for the diffusion of impurities to form resistors having higher resistivity than the host material if such are desired. FIGURE 7 shows a cross-section view of the slab after the etching at 24 for formation of the emitter region. The same process as discussed in relation to FIGURE 6 above is then repeated to cause diffusion of the emitter 26 as shown in FIGURE 8. Again, during the diffusion of the emitter region, a new layer of $SiO_x$ is grown over the area which was etched for emitter formation. The etching step is performed again to etch away the $SiO_x$ in the areas where contact is to be made to the crystal circuit. This results in the configuration shown in FIGURE 9. Next, the areas shown etched away to the surface of the host crystal in FIGURE 9 are coated with a compound or alloy containing proper type impurities to form an ohmic contact with the various crystal sections after diffusion or alloying. The entire crystal is then heated in a furnace to produce the ohmic contacts. Leads are alloyed to these contacts so as to produce the circuit shown in FIGURE 2. The resulting crystal configuration is shown in FIGURE 10.

In the integrated crystal circuit illustrated in FIGURE 10, the areas which must be protected from contamination are the base region which separates the emitter and collector of the transistor and the "p-n" junction of the diode. If the base area is contaminated, a collector to emitter short occurs and transistor action ceases. If the "p-n" junction of the diode is contaminated, the reverse current of the diode is high and valve action stops. Other contacts made to the crystal circuit do not require such protection. Therefore, in the case of a coplanar crystal circuit, such as shown in FIGURE 10, it becomes mandatory to provide protection of the contamination proof kind for one surface only. In the prior art, as discussed above, the required protection was attempted to be accomplished by encapsulating the entire device either in a container or by "potting." These techniques only contribute to loss of volumetric efficiency while adding a degree of mechanical integrity to the entire device which, in many instances, is not required until many such crystal circuits have been interconnected.

In FIGURE 11, there is shown a coplanar crystal circuit having one surface thereof encapsulated in accordance with our invention. In this figure, 40 indicates an impervious membrane such as glass, fused quartz, high resistivity semiconductor materials such as silicon, ceramic such as high density alumina or other material in the thickness in the order of .001"–.010". At 42 there is shown an epitaxially grown layer of $SiO_x$ in thickness the order of $2–10\times10^3$ A. This layer of $SiO_x$ is grown on the body 44 of the crystal circuit which may be "p" type silicon. At 46 there is shown a fusion bond between membrane 40 and the $SiO_x$ layer which extends around the periphery of the sensitive surface. This fusion bond is formed in a manner to be described below. With the exception of the addition of the leads, the solid circuit of FIGURE 11 is formed in the manner described in the explanation of FIGURES 3 through 10 above. Therefore, the addition of membrane 40 leaves a void or more specifically a vacuum of at least $10^{-6}$ Torr in areas 48. In FIGURE 11, reference numerals 50 refer to the alloy contacts to the various junction device elements. As to be explained below, hermetic feed throughs between the surface of the membrane 40 and alloy contacts 50 are provided. FIGURE 12 is an isometric view of the fabrication shown in FIGURE 11 wherein the same reference numerals apply to the same elements in both figures.

As indicated above, a wide latitude of choices of material for the membrance 40 of FIGURES 11 and 12 is available. The only restrictions on the choice of this membrane are that it must have vacuum integrity, it must be able to form a bond with the material comprising the chip and/or the $SiO_x$ coating thereon, it must be an insulator or high resistivity semiconductor, and it must not chemically attack the surface of the crystal circuit host semiconductor material at reasonable temperatures. For the purpose of further elaboration we will discuss the use of high resistivity silicon as the membrane. However, the comments as applied to silicon are equally applicable to the other materials listed above. In FIGURE 13 there is illustrated a corner of the chip with a high resistivity silicon membrane fused thereon. In this figure, the crystal circuit chip is indicated by reference numeral 52, the silicon membrane by 54 and the fusion area by 56. As shown, both the membrane 54 and the chip 52 have been surface passivated by the growth $SiO_x$ before making the fusion bond. The $SiO_x$ on the chip is indicated at 58 while the layer on both sides of the membrane is indicated at 60. The bond between the surface protected membrane and the crystal circuit chip is made by electron beam welding techniques which must, of course, be performed in a region of extremely low pressure.

Figures 14, 15, 16, 17, 18, 19, 20, 21, 22, 23, 24, 25, 26:
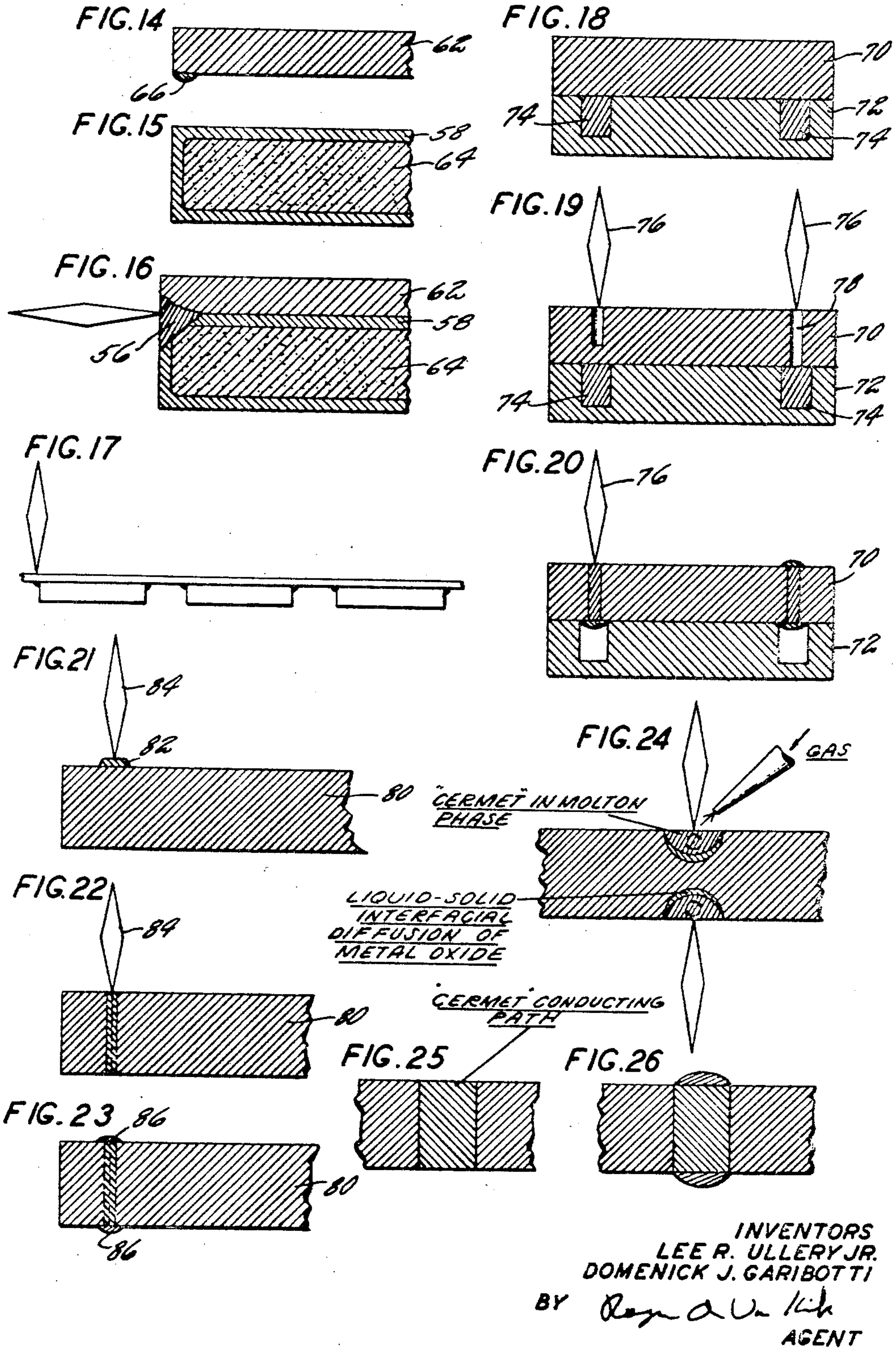
FIGURES 14 through 16 illustrate steps in the encapsulation of a semiconductor device in accordance with another method encompassed by our invention.
FIGURE 17 illustrates how our invention may be practiced to encapsule a plurality of semiconductor devices.
FIGURES 18 through 20 illustrate steps in the fabrication of hermetically sealed electrical conducting feed-throughs in an encapsulating membrane in accordance with our invention.
FIGURES 21 through 23 illustrate the steps involved in another method of fabricating hermetically sealed electrical feed-throughs in accordance with our invention.
FIGURES 24 through 26 illustrate the steps involved in yet another method of fabricating hermetically sealed electrical conducting feed-through in accordance with our invention.

By use of high voltage electron beam systems with small beam diameters, in the order of .001", and high energy density, a fusion bond of high strength and small heat effected zone can be fabricated. The fusion zone 56 may be as small as .001"–.005" or less in cross section width. Variations of the fabrication shown in FIGURE 13 are, of course, possible. For example, either or both of the membrane and crystal circuit chip need not have a coating of $SiO_x$ thereon or the membrane may have a $SiO_x$ coating on the top surface only. Also, the fusion zone 56 may be built up by use of a paste or filler rod. It is also possible to use means other than direct fusion to affix the membrane in a hermetic sealing relationship to the crystal circuit chip. As shown in FIGURES 14 through 16, a surface encapsulated semiconductor device may be fabricated having a membrane 62 separated from crystal circuit chip 64 by an intermediate member 66. Using electron beam techniques, intermediate member 66 may be fused to both membrane 62 and chip 64. Alternatively, the intermediate member may be bonded to the membrane by other methods prior to the joining to the chip. Typical intermediate members may be indium, gold, gallium, tin, lead, chromium, aluminum or other elements and alloys thereof from Groups II, III, V, VI and VIII of the Periodic Chart of the elements.

A typical method of fabricating the combination of the crystal circuit chip and the membrane consists of the steps of selection of the membrane, cutting the membrane to size, the depositing in precise geometry of the intermediate material on the membrane by vacuum deposition or sputtering followed by sintering and/or an electron beam disassociation process and joining the membrane to the solid circuit chip around its periphery by electron beam melting or diffusion processes. The above technique may be used to isolate hermetically discrete areas on a single semiconductor crystal circuit or for the bonding of a plurality of crystal circuits to a continuous membrane as shown in FIGURE 17. In the process depicted in FIGURE 17, the electron beam is caused to penetrate through the membrane to cause the fusion bond.

Utilization of the above-described techniques to hermetically encapsulate the contamination prone surfaces of crystal circuit devices naturally requires that means be provided for hermetically sealed electrical "feed-throughs" between the outer surface of the membrane and the alloyed areas of the discrete junction devices of the crystal circuit. Our invention encompasses various methods for providing electrical contact between the surface of the membrane and the emitter, collector and base areas of the transistors, the anode and the cathode areas of the diodes and the passive element terminations of the crystal circuit. In fabrication of the feed-throughs, the material used for the feed-throughs must, of course, be commensurate with the function of forming ohmic contacts to "n" and "p" type semiconductor areas.

A first method for producing hermetic feed-throughs encompassed by our invention forms the feed-throughs by the fusion of powder or metal wire in a hole. In this approach, a hole is initially drilled in the membrane, before it has been bonded to the crystal circuit chip, using the electron beam. The resultant hole will have a diameter on the order of .001" and will have a fused inner surface. After the hole has been drilled, several methods may be employed to produce the feed-through. In one method, the membrane is placed over a refractory block and the hole is filled with a metal powder. Heating the powder to a molten state with the electron beam and subsequently cooling the molten powder by reducing the beam intensity will result in a hermetic feed-through. A metal alloy powder, such as a dental alloy, which expands upon solidification may be used for this purpose. Alternatively, a wire may be placed in the hole, melted down with the electron beam and then allowed to resolidify. The feed-throughs produced by this method will be vacuum tight. The electron beam, in drilling the hole in the membrane, can be caused to create either a glassy or typical fused wall surface. A good bond between the glassy-like surface and the metal will be effected by wetting the molten metal to the glassy-like hole surfaces. With a fused surface, small intergranular diffusion of the molten metal occurs thereby permitting a good mechanical bond between the feed-through and the sides of the hole. Due to the electron penetration capabilities of the electron beam, beam intensity may be reduced in a fashion to allow solidification from the bottom to the top of the hole thus enhancing the integrity of the bond.

Another method of fabricating the feed-throughs is shown in FIGURES 18 through 20. These figures show a process wherein the metallic feed-through is produced by capillary action and thermal expansion backfilling of the electron beam drilled hole. In FIGURE 18, a membrane 70 is shown resting on a refractory block 72 having wells 74 therein. These wells are filled with the material, such as indium, which is to be used for the feed-throughs. An electron beam 76 is focused at the proper point to drill a hole 78 through the membrane. After drilling the hole, as shown in FIGURE 19, the beam locally heats the metal in the well to a liquid state. The puddle of metal is acted upon by surface tension and thermal expansion which causes it to flow up the drilled hole. The metal is then allowed to cool, forming the feed-throughs as shown in FIGURE 20.

Another method of forming a feed-through is by highly localized solid state directional diffusion or alloying of the feed-through material in the membrane. The physics involved in the diffusion or alloying processes are well known in the semiconductor arts. However, our process, which is shown in FIGURES 21 through 23, is novel in that it provides for highly localized and directional diffusion by interstitual diffusion in a single crystal or substitutional diffusion in a single crystal or intergranular migration in poly-crystalline materials. In FIGURES 21 through 23, the membrane is indicated by reference numeral 80. In FIGURE 21, a small dot 82 of the feed-through material is vacuum deposited on the upper surface of the membrane 80. By application of the electron beam 84, which is a highly localized heat source, a highly localized area of the membrane can be made electrically conductive as shown in FIGURE 22, to form a hermetic electrical conductor through the membrane. Subsequent to the diffusion of the conducting path, small contact pads 86 can be deposited on the exposed area of the feed-through, as shown in FIGURE 23, for joining to the active elements of the solid circuit.

The feed-throughs may also be fabricated by means of the directional dissociation of a compound material. FIGURES 24 through 26 illustrate this method. In FIGURE 24, a complex metal oxide membrane, which may be a ceramic such as $Al_2O_3$, is subject to electron beam heating while a gas, such as $H_2$, is played thereon.

While the operation is performed in an evacuated chamber, the supply of gas to the beam impingement point is such that extremely high very local pressures are created, the reaction products simultaneously being pumped off at a very rapid rate. This results in a temperature assisted decomposition process. The resultant chemical dissociation in a highly localized area produces the "cermet" conducting path shown in FIGURE 25. The term "cermet," of course, indicates a mixture of ceramic and metal. After the "cermet" path has been produced, contact pads may be vacuum deposited or electroless plated on the terminations of the path to provide ohmic contact thereto as shown in FIGURE 26.

Figure 27:
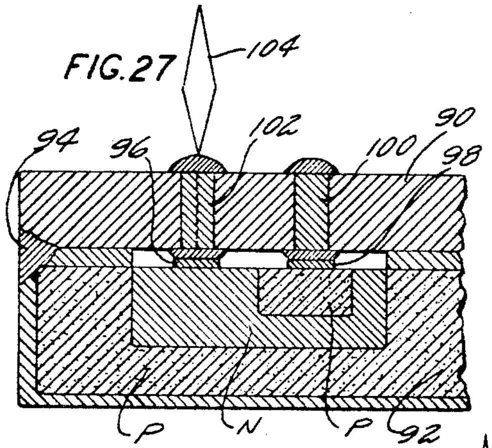
FIGURE 27 illustrates the making of electrical contact between an encapsulated semiconductor device and external devices in accordance with our invention.

Once the membrane with the feed-throughs has been produced, the membrane may be joined to the crystal circuit and the feed-throughs electrically connected to the active device areas in the following manner. The inherent capability associated with high voltage electron beam penetration makes it possible to secure a bond between the alloy contact area on a semiconductor device and the terminus of the feed-throughs. This phenomenon is due to the fact that an electron beam joining is an electron penetration rather than a thermal conduction phenomenon. For a more complete description of high intensity electron beam penetration welding, reference may be had to U.S. Patent No. 2,987,610, issued to K. H. Steigerwald on June 6, 1961. The process disclosed in the Steigerwald patent enables the production of "blind welds"; that is welds which are made at some depth below the surface of the target material. In FIGURE 27, a membrane 90 has been joined to a crystal circuit chip 92 with an electron beam weld at 94. Solid circuit 92 comprises a semi-conductor device having "n" and "p" type regions with an "n" type ohmic contact at 96 and a "p" type ohmic contact at 98. The membrane 90 has a "p" type hermetic feed-through at 100 and an "n" type hermetic feed-through at 102. Contact pads may have been deposited at the ends of these feed-throughs prior to welding the membrane to the chip. An electron beam 104 is programmed to penetrate the depth of the feed-throughs 100 and 102 and to cause a fusion bond between these feed-throughs and contacts 96 and 98.

Figure 28:
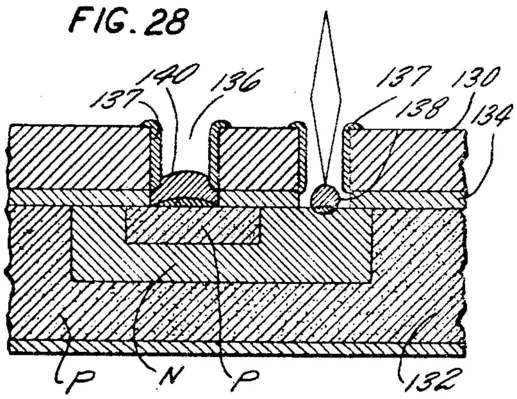
FIGURE 28 illustrates the making of electrical contact between an encapsulated semiconductor device and external devices in accordance with another method encompassed by our invention.

It should be remembered that the various steps involved in our invention wherein an electron beam is utilized as a drilling or welding tool are performed in a vacuum. This adds to the feasability of another method of forming feed-throughs. In FIGURE 28, a membrane 130 has been electron beam welded to the surface of a crystal circuit chip 132 having a layer 134 of $SiO_x$ thereon. Before bonding the membrane to the chip, holes 136 are drilled therein and a metalized surface 137 is then formed on the sides of the holes by the deposition of a material such as titanium hydride thereon by processes known in the art. When it is desired to make hermetically sealed electrical connections between the surface of the membrane, which has now been bonded to the chip, and the contact pads on the semiconductor devices of the crystal circuit, a ball 138 of material such as indium, gallium, gold, tin, lead, antimony and alloys of these and other elements from Groups II, III, V, VI and VIII of the Periodic Chart of the elements is dropped in the hole and melted with an electron beam. When the electron beam is shut off, the molten material will solidify thereby forming a hermetically sealed contact between the contact pad on the chip and the metalized wall of the hole as shown at 140. Electrical contact between the surface of the membrane and the crystal circuit elements can then be made via the metalized surface on the sides of the holes.

Figure 29:
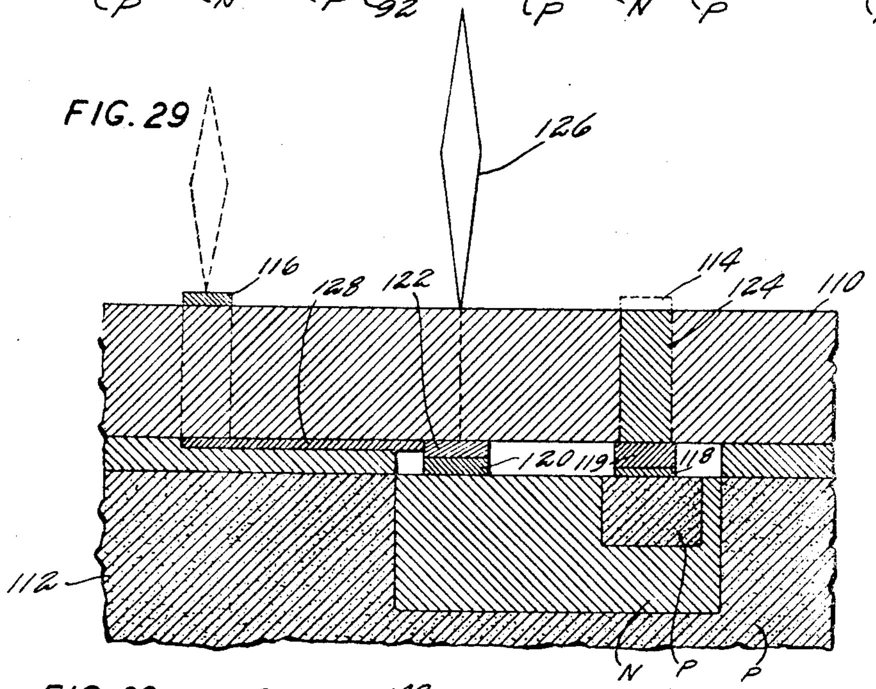
FIGURE 29 illustrates still another example of making electrical contact between an encapsulated semiconductor device and external devices in accordance with our invention.

The versatility of the electron beam process also permits the fabrication of the feed-throughs themselves after the assembly of the membrane semiconductor composite. FIGURE 29 illustrates this feature of our invention. In FIGURE 29, contact pads are deposited on the membrane and junction devices in the manner described in connection with FIGURE 21 above. The membrane is then bonded to the crystal circuit chip with an electron beam weld. Next, the electron beam is applied to the desired feed-through areas and the feed-throughs are fabricated in the manner described in connection with FIGURE 22 above. Simultaneously the feed-throughs are fused to the active element contact pads of the semiconductor device. In FIGURE 29 the membrane 110 has been electron beam welded to the solid circuit chip 112. Metal vacuum deposited dots of the feed-through material are deposited on the membrane at 114 and 116. The contact pads, which are deposited on the membrane and junction device prior to the welding of the membrane to the crystal circuit chip, are shown at 118, 119, 120, and 122. Using an electron beam, a feed-through 124 is produced by electron beam caused diffusion of dot 114 through the membrane. At the same time the electron beam is fabricating the feed-through it also causes a fusion bond between feed-through 124 and contact 119 and also between contacts 118 and 119. The electron beam 126 is then programmed to a point above contacts 120 and 122 wherein it penetrates the membrane, without drilling a hole therein, and causes a fusion bond between contact 120 and contact 122 on the membrane. The beam can next be programmed over dot 116 where a second feed-through is fabricated. FIGURE 29 also illustrates another feature of our invention wherein feed-throughs can be formed in the membrane between coplanar deposited conductors on the inner surface of the membrane. Such a coplanar conductor is shown at 128. The feed-through caused by diffusion of dot 116 through this membrane forms a contact with conductor 128. The advantage of utilizing the coplanar conductor 128 is that the exposed surface leakage path between the emitter or collector and base of the transistor is increased while still retaining the narrow base region within the crystal circuit device.

As previously mentioned, prior art integrated crystal circuits often utilize the surface of the $SiO_x$ layer on the host material as the conductive path between elements in the circuit by means of vapor deposition of conductors and passive elements thereon. Because of the thinness of the layer of $SiO_x$ and its dielectric properties, relatively high capacitances exist between the crystal circuit and the deposited elements. When using our invention, the conductors and passive elements may be deposited upon the outer surface of the membrane thereby greatly increasing the distance between these deposited elements and the crystal circuit. This in turn, of course, greatly reduces the capacitance between the passive elements and the crystal circuit and thereby improves the high frequency response of the device. For example, referring again to FIGURE 29, the conductor indicated by reference numeral 128, may be deposited on the outer surface of the membrane. In such a case, the feed-through fabricated from diffusion of dot 116 would, of course, make contact with another element of the crystal circuit.

Figure 30:
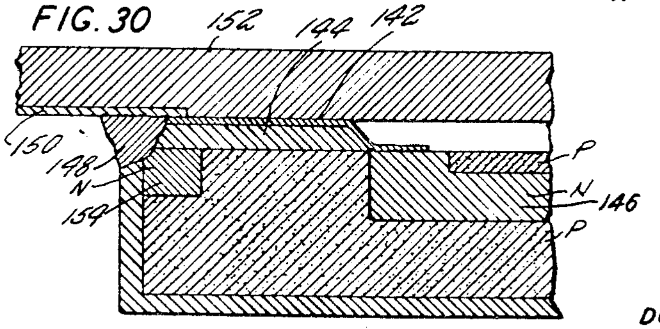
FIGURE 30 illustrates a means whereby coplanar hermetic feed-throughs are made between a surface encapsulated semiconductor device and a point externally of said encapsulated surface in accordance with our invention.

FIGURE 30 depicts a portion of a surface encapsulated crystal circuit device having a horizontal interconnection between the integrated crystal circuit surface and an external point. In this figure, a conductor 142 for interconnection of an element of the crystal circuit to an external point has been vapor deposited on the $SiO_x$ layer 144 of the crystal circuit. This conductor provides contact between the base 146 of a junction device and a fusion zone 148. A second conductor 150, which has been deposited on impervious encapsulating membrane 152, makes contact between fusion zone 148 and an external point. In fabricating the crystal circuit, there is provided a degeneratively conductive region at 154 by diffusing an impurity into the host material so as to change its conductivity from "p" to "n". This region, which is highly conductive, functions as a back biased diode to prevent short circuiting of the junction device. The degenerative region or blocking element 154 is formed, in the specific location at which it is desired to later form the connection between conductors 142 and 150, by alloying to degeneracy the host material of the crystal circuit in a highly localized area. Since blocking element 154 is a p–n junction device which functions as a back biased diode, current cannot flow therethrough between the base region of the junction device and the collector region through the fusion area. In other areas, the base lead 142 is insulated from the collector region by the $SiO_x$ layer 144.

As discussed previously, prior art encapsulated crystal circuits are often subject to failure due to the breakdown of semiconductors caused by overheating. This comes about as a result of the inherent thermal inefficiency of the prior art methods of dissipating heat generated at the junction areas in semiconductor devices.

Our invention provides for high efficiency from both the heat dissipation and volumetric standpoints. For example, a material such as beryllium oxide may be used as the encapsulating membrane. As is well known, beryllium oxide is an insulator but has a thermal conductivity approaching that of aluminum. The intimate contact between the surface of the crystal circuit and the membrane provides a large surface for conducting the heat away from the junction areas of the devices. Obviously, the use of a beryllium oxide membrane provides a much more efficient and thus safer method for protecting semiconductor devices from overheating than the prior art methods of thermal dissipation through the leads or bulk of the host crystal. From the above it follows that our invention has the advantage of permitting operation of semiconductor devices up to the maximum operating temperature of silicon whereas prior art encapsulated semiconductor devices had much lower limits of maximum operating temperature. This is particularly true in the case of polymeric material encapsulated devices since these materials break down in the junction areas, thereby permitting contamination, at temperatures below the 200° C. maximum operating temperature of silicon junctions.

As can be seen from the above discussion, our invention provides advantages not obtainable in the prior art. These advantages include elimination of the compromised volumetric efficiency of prior art encapsulation techniques and, in addition, a reduction in the number of external input-output connections to a crystal circuit or array of single semiconductor elements. Also, the use of an encapsulating membrane, as taught by our invention, improves the high frequency response of and thermal dissipation from encapsulated semiconductor devices. The membrane further offers a means to support rigidly several crystal circuits or semiconductor devices without intermediate steps in the interconnections. Also, the membrane permits offsetting of the emitter or collector base leads at the exposed surface thereby minimizing surface leakage. Since the membrane consists of an inert material, the danger of active area contamination is also minimized with our invention. In the encapsulating techniques which we have disclosed and which constitute part of our invention, the number of potential contaminating agents is considerably reduced, the number of fabrication steps is reduced and, by using programming means for the electron beam generators, it is possible to improve the yield and reduce the cost of fabrication through automation of the process.

While preferred embodiments of our invention have been shown and disclosed, various modifications and substitutions may be made without deviating from the scope and spirit thereof. For example, while we have devoted the discussion of our invention largely to the application of electron beam heating and welding techniques, any other highly localized and controllable heat source, such as a Laser, might be utilized. Thus, our invention has been desecribed by way of illustration rather than limitation and accordingly it is understood that our invention is to be limited only by the appended claims taken in view of the prior art.

We claim:

1. The method of fabricating a hermetically encapsulated semiconductor device comprising:

forming a semiconductor device from a body of intrinsic semiconductor material by diffusing impurities into the upper surface thereof;

positioning an impervious, nonconductive encapsulating member over the upper surface of the body; and fusion bonding the member to the device around the periphery of the body of semiconductor material.

2. The method of claim 1 wherein the bonding is accomplished by welding the member to the device with an electron beam.

3. The method of fabricating a hermetically encapsulated integrated crystal circuit device comprising:
- forming the desired coplanar circuit in a single chip of intrinsic semiconductor host material by diffusing impurities into the upper surface thereof;
- placing an impervious nonconductive encapsulating member over the upper surface of the chip of host material;
- fusion bonding the member to the chip of host material around the periphery of the chip of host material, and
- producing hermetically sealed conductive paths between the exposed surface of the member and the circuit elements of the crystal circuit.

4. The method of claim 3 wherein the step of fusion bonding comprises welding the member to the crystal circuit host material with an electron beam.

5. The method of claim 3 wherein the step of fusion bonding the member to the crystal circuit host material comprises:
- depositing an intermediate material on the member before placing it over the upper surface of the chip; and
- producing a bond between the intermediate material and the crystal circuit host material.

6. The method of claim 3 wherein the step of producing hermetically sealed conductive paths between an exposed surface of the member and the circuit elements of the crystal circuit comprises:
- forming hermetically sealed conductive paths through the member prior to bonding of the member and crystal circuit host material, and
- blind welding the inner terminations of the conductive paths to the contact pads on the crystal circuit elements after the joining of the member and host material.

7. The method of claim 6 wherein the step of forming hermetically sealed conductive paths through the member comprises:
- drilling holes through the member, and
- filling the holes in the member with a conductive material which forms a tenacious, hermetically sealed bond with the surfaces of the hole.

8. The method of claim 7 wherein the step of filling the holes with conductive material comprises:
- placing the member with the holes drilled therein over a source of conductive material, and
- melting said conductive material whereby it flows upward into and thus fills the holes.

9. The method of claim 6 wherein the step of forming hermetically sealed conductive paths through the member comprises:
- depositing conductive material on the exposed surface of the member in discrete areas where conductive paths are to be formed, and
- causing the conductive material to locally diffuse through the member thereby forming conductive paths.

10. The method of claim 9 wherein the step of causing diffusion comprises:
- directing an electron beam against the deposited conductive material thereby melting said conductive material and the underlying nonconductive material thus causing the conductive material to diffuse through the member.

11. The method of claim 6 wherein the step of forming hermetically sealed conductive paths through the member comprises:
- heating a localized area of a surface of the member, and simultaneously supplying a reducing agent to the heated area whereby decomposition of the member occurs and a conductive path therethrough is formed.

12. The method of claim 3 wherein the step of producing hermetically sealed conductive paths between an exposed surface of the member and the circuit elements of the crystal circuit comprises:
- forming hermetically sealed conductive paths through the member after the joining thereof to the crystal circuit host material by causing highly localized diffusion or alloying of a metal through the member and simultaneously causing electrical contact to be made between the inner terminations of the conductive paths and the contact pads on the crystal circuit elements.

13. The method of claim 3 wherein the step of producing hermetically sealed conductive paths through the member comprises:
- drilling holes through the member prior to the joining thereof to the crystal circuit host material,
- depositing conductive material on the side of the holes, and
- filling the conductively coated holes with conductive material after the joining of the member to the crystal circuit host material.

14. The method of making contact to a hermetically encapsulated semiconductor device comprising:
- depositing conductive material in a discrete area on the surface of the nonconductive encapsulating medium above the point where it is desired to make contact to the semiconductor device,
- causing localized diffusion of the conductive material through said membrane to the surface of said semiconductor device, and
- producing a bond between the conductive material and the semiconductor device.

15. The method of claim 14 wherein the step of causing diffusion comprises:
- directing an energized beam against the deposited conductive material,
- maintaining the beam focused on the material until it has diffused through the encapsulating medium in the form of a narrow channel, and
- adjusting the intensity of the beam so that a bond will be formed between the inner termination of the diffused conductive material and the semiconductor device.

16. A method of forming conductive paths through an insulating member comprising:
- forming small diameter holes in the insulating member,
- placing the insulating member with the holes formed therein over a member having recesses therein filled with conductive material,
- placing the assembly thus formed in an evacuated chamber, and
- directing an electron beam through the holes to melt the conductive material whereby the conductive material will flow upward into and thus fill the holes due to capillarity and thermal expansion.

17. A method of forming vertical conductive paths through a metal oxide insulating member comprising:
- directing an intense electron beam against a first surface of a metal oxide insulating member to melt the member in the beam impingement area,
- applying a reducing agent in the neighborhood of the beam impingement point whereby the metal oxide is reduced and a molten metal conductive area is formed, and
- regulating the beam intensity so that the molten area extends progressively downward through the insulating member in a localized region.

18. A method of forming a conductive path through an insulating member comprising:
- depositing conductive material in a discrete area on the surface of the insulating member,
- directing an intense electron beam against said conductive material whereby the conductive material and the insulating member melt in the localized area impinged upon by the beam, and regulating the beam intensity so the molten area extends progressively downward through the member and the conductive material is caused to diffuse throughout the molten area thereby forming a conductive path through the member.

References Cited by the Examiner

UNITED STATES PATENTS

| | | | |
|---|---|---|---|
| 2,561,411 | 7/51 | Pfann | 29—25.3 |
| 2,680,220 | 6/54 | Starr et al. | 317—235 |
| 2,778,926 | 1/57 | Schneider | 29—155.5 |
| 2,898,519 | 8/59 | Foster | 317—101 |
| 2,971,138 | 2/61 | Meisel et al. | 317—101 |
| 2,981,877 | 4/61 | Noyce | 29—25.3 |
| 3,029,366 | 4/62 | Lehovec | 317—101 |
| 3,042,998 | 7/62 | Sweett et al. | 29—155.5 |
| 3,059,322 | 10/62 | Teague | 29—155.5 |
| 3,128,538 | 4/64 | Kutschern | 29—155.5 |

FOREIGN PATENTS

| | | |
|---|---|---|
| 228,906 | 7/60 | Australia. |
| 727,460 | 3/55 | Great Britain. |

OTHER REFERENCES

"Integrated Circuit Package," IBM Technical Disclosure Bulletin, vol. 3, No. 12, May 1961, R. S. Schwartz.

JOHN F. CAMPBELL, *Primary Examiner.*

JOHN F. BURNS, *Examiner.*